[11] 3,612,769

United States Patent

[72] Inventor Gary F. Oman
Greendale, Wis.

[21] Appl. No. 34,044
[22] Filed May 4, 1970
[45] Patented Oct. 12, 1971
[73] Assignee Johnson Service Company
Milwaukee, Wis.

[54] DATA TRANSMISSION
8 Claims, 3 Drawing Figs.

[52] U.S. Cl. .......... 179/15 A, 179/15 AN, 179/15 BL
[51] Int. Cl. .......... H04j 3/10
[50] Field of Search .......... 179/15 LL, 15 A, 15 AN; 325/38 A; 340/183, 413

[56] References Cited

UNITED STATES PATENTS 3,427,475 2/1969 Wilkinson et al. .......... 179/15 LL

*Primary Examiner*—Kathleen H. Claffy
*Assistant Examiner*—David L. Stewart
*Attorneys*—Andrus, Sceales, Starke & Sawall and Arnold J. DeAngelis

ABSTRACT: A multiplexed data system includes a multiplexing means sequentially connecting data points to a transmission line which is connected to an analog-to-digital converter. The data is transmitted by a current limit operational amplifier to establish a constant current line response between successive data points. A digitizing control includes a slope-detecting operational amplifier connected to differentiate the line voltage. An inverting pulse shaper and a noninverting pulse shaper are connected to the amplifier to establish a pair of control signals connected to a two-input NAND gate, the output of which is connected to trigger an analog-to-digital converter connected to the line and establish readout in synchronism with the settling of the line voltage.

INVENTOR.
Gary F. Oman
BY
Andrus, Sceales, Starke & Sawall
Attorneys

DATA TRANSMISSION

BACKGROUND OF THE INVENTION

The present invention relates to a high-speed multiple point readout system and particularly to the scanning and transmitting of information from a substantial number of points over a common transmission system.

In the development of information handling and transmitting, various systems have been devised for the simultaneous and sequential transmission of information in order to minimize the time and cost factor involved in the accumulation and transmission of data.

A widely employed information transmission system involves multiplex transmission wherein a single transmission line is sequentially connected to transmit information from a number of different sources or points. A convenient analog transmission system employs a time switching of the particular points in order to collect the information transmitted by each point. The voltage level on the transmission line at the several points encodes the point informations which is decoded at the output end of the line. Upon switching from one point to the next, a finite time is required to permit the line to settle to the voltage level at the newly connected point. The particular length of time required is dependent upon a number of different variables. Thus, the encoder output impedance, the length and capacitance of the line as well as the decoder response and the previous voltage level of the transmission line will all affect the length of the settling time. Generally, the longest settling time required for any given change is determined and the readout system is then designed to correspondingly delay readout or digitizing of the line voltage to insure that the transmission line voltage has settled to the stable level. The time delay between particular readings may, therefore, often be in excess of the actual settling time required. This results in a relatively inefficient time usage particularly where the settling time may be relatively large compared to the actual digitizing time. Generally, the transmission line voltage is an exponential-type response which has made it very difficult, if not impossible, to accurately determine the initiation and termination of the settling time. However, applicant realized that if a constant current output characteristic of the newly accessed point, during the transition from the previous point, is developed, successful differentiation of the change can be established and, furthermore, that integrated circuit amplifiers may result in constant current transmission line response.

SUMMARY OF THE PRESENT INVENTION

The present invention is particularly directed to a high-speed readout system and particularly to a means for rapidly scanning the information sources and points in a multiplexed data acquisition system having means to differentiate the transmission line voltage to accurately detect the determination of the line voltage change and thereby multiplex the signal immediately upon settling of the transmission line voltage. In accordance with the present invention, a constant current transmission line response is obtained, for example, through the use of a suitable integrated circuit amplifier. The transmission line voltage is applied as an input to a slope-detecting means such as an operational amplifying unit having a feedback network establishing a differentiation of the line voltage. The output of the differentiating means is applied to an inverting pulse shaper and simultaneously to a noninverting pulse shaper to establish a pair of related output control signals. The output of the pulse shapers is connected to a logic control network to generate a pulse width modulated square wave signal having a trailing edge established in synchronism with the settling of the input transmission line voltage to the next voltage readout level. Thus, the logic control network can be applied to a two-input NAND GATE, the output of which is connected to trigger a digitizing apparatus such as an analog-to-digital converter.

More particularly, the operational amplifying unit includes the appropriate input impedance and feedback impedance to produce a differentiation of both the negative and positive slope signals. When the voltage is either increasing or decreasing, the slope detector response to the changing voltage level provides a corresponding output which, when applied to the pair of signal channels, generates a pair of pulse signals to the NAND gate causing it to establish a selected higher voltage level. At the end of the slope voltage, the NAND gate reverts to the normal output level, thereby producing a sharp change from the higher to the lower level. The high-to-low transition is interconnected to the analog-to-digital converter to trigger it and establish a readout.

The present invention thus provides a rapid readout for a multiplex data acquisition system wherein the digitizing or readout is established immediately upon sensing of the settling of the transmission line voltage to the stable level.

BRIEF DESCRIPTION OF DRAWING

The drawing furnished herewith illustrates the best mode presently contemplated by the inventor in which the above advantages and features are clearly disclosed as well as others which will be readily understood from the description of the illustrated embodiment.

In the drawing.

DESCRIPTION OF THE ILLUSTRATED EMBODIMENT

Figure 1:
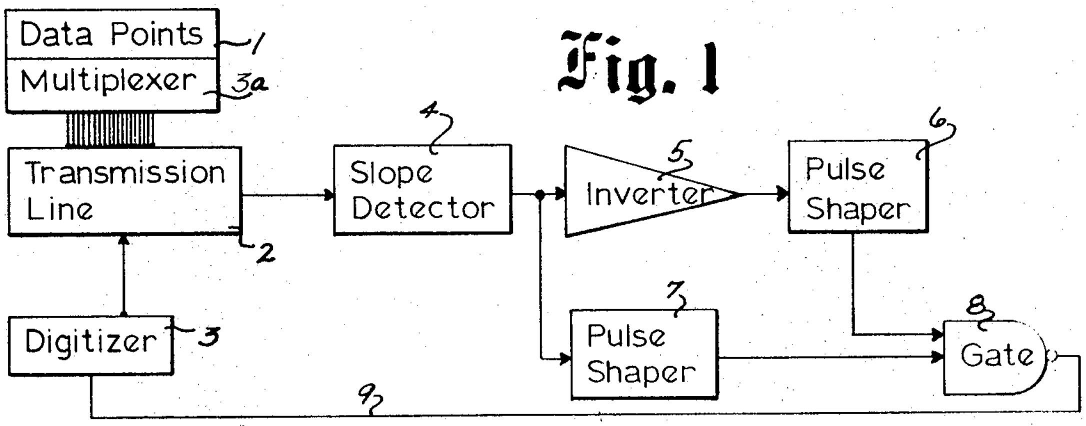
FIG. 1 is a block diagram of a multiplex data acquisition system employing the readout control system of the present invention.

Referring to the drawing and particularly to FIG. 1, a data source 1 is illustrated which may incorporate any substantial number of information points which are to be connected through a common transmission line 2 to a suitable readout such as a digitizing unit 3. Thus, the source 1 may include a plurality of different temperature, humidity or condition-sensing elements which are to be interconnected to transmit related information encoded as an analog voltage level signal to the digitizing unit 3 for recording of the information or the like. The transmission of the several points is multiplexed through a suitable multiplexing switch 3*a* to sequentially and cyclically connect the several points to line 2. The information is transmitted from a given point over the line at a selected voltage level related to the information. The voltage level at the next point may be at the same or a different level depending upon the information. The multiplexing system, therefore, is constructed such that the transmission of the information is delayed to permit the transmission line 2 to change from a first voltage level to another. The present invention is particularly directed to a digitizing unit control which is adapted to determine the settling point of the transmission line 2 and immediately actuates the digitizing unit 3 to establish a readout which provides a signal to the multiplexer when the readout function has been completed. Line 2, which is diagrammatically shown in FIG. 1, is connected to a suitable point amplifier which will linearly charge the distributed transmission line capacitance with a current limited output characteristic. When the point has reached the correct voltage level, the amplifier establishes the characteristic of a constant voltage source. For example, the current-limited operational amplifier LM201A, sold by National Semiconductor Corp. of Santa Clara, Calif., has been found to provide a satisfactory source.

In the illustrated embodiment of the invention, the control for operating unit 3 generally includes a slope detector 4 connected to the transmission line 2 to detect and respond to the voltage of the transmission line. The output of the slope detector 4 is applied to an inverting pulse-shaping channel or network including an inverter 5 and a pulse shaper 6 to establish a first related control signal. The output of the slope detector 4 is simultaneously applied to a noninverting pulse-shaping channel including a pulse shaper 7 to produce a second control signal. The outputs of the pulse shapers 6 and 7 are applied to a suitable logic element shown as a two-input NAND gate 8, the output of which is connected via a line 9 to operate the digitizing unit 3.

The slope detector 4 responds to the constant current transmission line input to accurately differentiate the slope of the changing voltage when switching from one data point to the next. The detector 4 is constructed to differentiate both positive and negative slopes and provide a related control signal in response to both lowering and raising of the transmission line voltage.

The pulse shaper 7 provides a suitable standardized control pulse at the initiation and termination of the slope detection. The inverter 5 and pulse shaper 6 provides a similar inverted pulse signal.

The signals which are applied to the NAND gate 8 establish a square wave output signal, the trailing edge of which is in synchronism with the end or termination of the slope voltage. The trailing edge of the signal provides, at line 9, a sharp voltage level change which triggers the digitizing unit 3. The operation of unit 3 converts the settled analog voltage signal on the line 2 to an appropriate digital signal related to the information. After the transmission of the information, which is normally a set-time period, the transmission line 2 is encoded by the multiplexer *3a* to the new voltage level of the next data point to permit subsequent transmission of information. The change of voltage level is again sensed by the slope detector 4 to provide subsequent reenabling of the digitizing unit 3 in synchronism with the termination of the change in voltage level. Thus, the data point information is sequentially transmitted over the transmission line 2 with a time delay between the transmission information being controlled on a point-by-point basis. As a result, an essentially minimal time is established between each of the transmission points and, consequently, the transmission and switching time is optimized to maintain maximum transmission speed.

Figure 2:
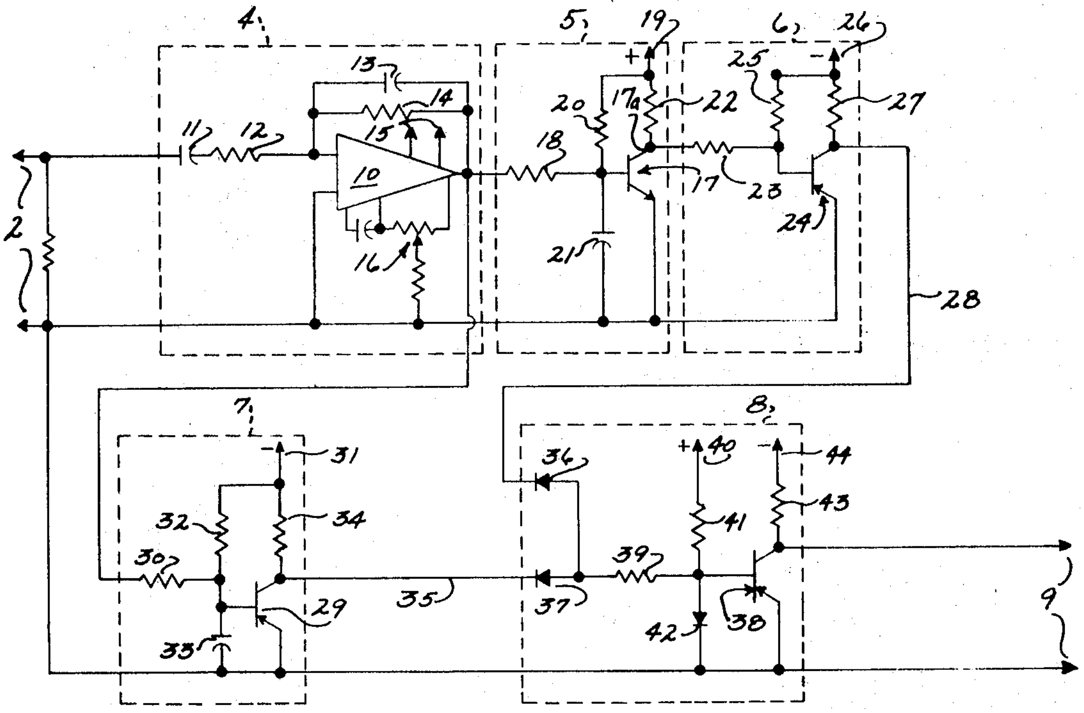
FIG. 2 is a schematic circuit diagram of a readout control system circuit illustrating a preferred construction of the elements shown in FIG. 1.

In FIG. 2, a schematic circuit is shown illustrating a preferred embodiment of the components shown in block diagram in FIG. 1. In FIG. 2, the slope detector includes a linear amplifier 10 interconnected to the transmission lines through a series-connected capacitor 11 and resistor 12. An amplifier feedback network includes a capacitor 13 in parallel with a resistor 14 connecting the input and output of the amplifier 10. Capacitor 11 and resistor 14 primarily define the differentiating network. Resistor 12 and the capacitor 13 improve circuit stability and capacitor 13 also tends to eliminate the effects of high-frequency noise. The linear amplifier 10 is provided with suitable supply from positive and negative voltage bias lines 15 to produce a floating bias supply with a balancing and stabilizing network 16 interconnected between the amplifier and the common return. The amplifier 10 with the capacitive input and the resistive feedback provides a well-known differentiating operational amplifier, the output of which is proportional to the slope of the input signal.

The output of the operational amplifier 10 is connected to the inverting and noninverting pulse-shaping networks.

In FIG. 2, the inverter 5 of the inverting pulse-shaping network includes a transistor 17 interconnected to invert the output signal of the slope detector 4. The transistor 17 is shown as an NPN transistor having its base directly coupled to the output of the detector 4 by a resistor 18. The base is also connected to a positive bias supply line 19 in series with a resistor 20 and to the common return line in series with a capacitor 21. The emitter is connected directly to the common return line and the collector is returned to the positive supply line 19 in series with a collector resistor 22. In the absence of an output signal of amplifier 10, the transistor 17 is biased on, conducts and provides a relatively reference or ground signal to the pulse shaper via coupling resistor 23.

The pulse shaper 6 is shown in FIG. 2 including a PNP transistor 24 connected in a common emitter configuration. The emitter of transistor 24 is connected to the reference line and the base connected to the collector of transistor 17 in series with a coupling resistor 23 and also via a relatively large resistor 25 to a negative supply line 26. The latter is also connected to the collector via a load resistor 27. An output line 28 connects the collector of transistor 24 to one input of gate 8. With the transistor 17 conducting, the base of the transistor 24 is held slightly negative with respect to the reference. Thus, the conducting transistor 17 connects the junction of resistors 22 and 23 to the reference. The negative supply line 26 thus divides across resistors 23 and 25 and holds the base of the transistor 24 slightly negative. Consequently, the transistor 24 is normally on and establishes a relatively positive or only slightly negative output signal or potential at the output line 28 establishing a first input to the NAND gate 8 as subsequently described. With transistor 17 off, resistors 22, 23 and 25 form a voltage-dividing network holding the base of transistor 24 at a positive voltage relative to the emitter and reference or common line. Thus, resistor 25 is substantially larger than resistor 22 and 23 and the greater portion of the voltage between lines 19 and 26 appears across resistor 25.

The noninverting pulse shaper 7 is connected directly to the output of the slope detector 4. The noninverting pulse shaper includes a transistor 29 also connected in a common emitter configuration with the base connected to the output of the slope detector via a coupling resistor 30. The emitter is connected directly to the reference line and the base is connected to a negative supply line 31 through a suitable bias resistor 32. A transient bypass capacitor 33 is also connected between the base and the reference line. The collector is connected via the load resistor 34 to the negative supply line 3l.

In the absence of a signal from the operational amplifier 10, the PNP transistor 29 is biased on. The collector is at relatively reference or slightly negative potential. In response to an input signal, the transistor 29 is driven off and the collector potential rises toward that of the negative supply line 31. The collector potential thus correspondingly charges the second input to the NAND gate 8 via the output line 35.

Thus, in the absence of an output from a slope detector, a pair of corresponding input signals are applied to the NAND gate 8 which, in the illustrated embodiment of the invention, is a slightly negative potential.

The NAND gate 8 includes a pair of diodes 36 and 37 having their cathodes connected respectively to the lines 28 and 35 and having their anodes connected in common to a logic-inverting transistor 38 through a common resistor 39. The transistor 38 is a PNP transistor connected in a common emitter configuration with the emitter connected directly to the reference line and the base connected to the resistor 39 and also to a positive supply line 40 in series with a dropping resistor 41. The clamping diode 42 is interconnected across the base-to-reference line. The collector of the inverting transistor 38 is connected in series with a load resistor 43 to a negative supply line 44. The control or output lines 9 are connected to the collector and the emitter directly.

With the transistors 24 and 29 off, the positive bias line 40 is connected in series with resistors 41 and 39 via the respective diodes 36 and 37 with the collector resistors 27 and 34 respectively to the corresponding negative supply lines 26 and 31. The resistor 41 is substantially larger than the other resistors and particularly the collector resistors 27 and 34. The base of transistor 38 is therefore negative with respect to the common line and transistor 38 conducts. Conversely, with either or both of the transistors 24 and 29 on, the potential at the corresponding collector increases to the reference potential with a corresponding rising of the potential of the common node. This is reflected in a rising potential at the base of transistor 38 and a back-biasing thereof. The transistor 38 thus turns off and the potential of the collector rises to the negative voltage of the supply.

In the reading period, there is a relatively zero output from the slope detector 4, the transistors 24 and 29 are on and the corresponding relatively reference potentials are connected to the diodes 36 and 37. In this condition, the base of transistor 38 is held at a relatively positive polarity level, back-biasing the base-to-emitter circuit. The NAND gate 8 is in a condition holding the transistor 38 off. The signal is applied to the digitizing unit to initiate the conversion. After the conversion, the digitizing unit 3 signals the multiplexing means to scan the next point.

When the transmission line voltage changes, the slope detector 4 provides an output proportional to the slope; that is, to the time rate of voltage change. This output simultaneously is applied to the noninverting pulse shaper 7 and to the inverter 5. Depending upon the polarity of the signal, which is related to a negative or positive slope, the signal is operative to change the condition of one of the two channels.

A relatively positive output signal applied via the resistor 30 to the PNP transistor 29 will back bias this transistor, thereby turning off the pulse shaper 7. The positive pulse applied to the inverting network or transistor 17 via the resistor 18, however, merely causes it to maintain the conducting state and thus does not affect the inverting channel.

The turnoff of the transistor 29 causes the collector to rise to a negative potential as a result of the interconnection to the negative bias line 31. This provides a path from the positive bias line 40 of the NAND gate through the resistor 41, resistor 39, diode 37, line 35, resistor 34 and the negative line 31. This results in a relative negative potential at the common node which back biases the alternate-conducting diode 36 and establishes a relative negative signal at the base of the transistor 38 thereby permitting it to conduct. When the transistor 38 conducts, the collector potential rises to the reference potential and thus the output rises sharply to a pulse signal. This condition is maintained as long as the slope detector maintains its signal output which is proportional to the slope of the changing voltage.

As soon as the voltage of transmission line 2 settles to the next value, and there is no longer a slope in the transmission line signal, the output of the detector 4 reverts to the normal standby state. As a result, the transistor 29 again turns on and resets the NAND gate 8 resulting in turnoff of the transistor 38 and a drop in the collector potential.

The output is, therefore, a square wave signal such as shown at 45 in FIG. 2 with the period or length of the pulse 45 directly dependent upon and equal to the period that the line voltage 46 of FIG. 2 changes and thereby establishes a slope of other than zero. The pulse is therefore a pulse-width-modulated timing signal, the trailing edge of which is connected to trigger or actuate the digitizing unit 3 to record the signal then on the transmission line.

If the output of the slope detector 4 is a relatively negative signal with respect to the reference line, it is simultaneously applied to the two channels. The negative signal applied to the transistor 29 does not, in any way, affect its operation as it is biased on by a negative signal at the base of transistor 29. The negative signal, however, at the base of the transistor 17 causes it to cut off and the potential at the collector 17*a* rises towards the voltage of the positive bias line 19. Thus, the bias voltage to the base is now between the positive bias line 19 and the negative bias line 26 through the resistors 22, 23 and 25. Resistor 25 is substantially larger than either or the sum of the resistors 22 and 23 and, consequently, the base of transistor 24 will be held at a relatively positive potential. The positive potential at the base of the NPN transistor 24 back biases its base-to-emitter junction thereby causing the transistor 24 to turnoff, whereupon the signal at the output line rises to a negative logic control signal. The negative signal applied to the cathode of the diode 36 results in a corresponding relatively negative signal at the common node with respect to the previous potential. This back biases the diode 37 and establishes a relatively negative potential on the base of the transistor 38. The transistor 38 then conducts and generates a pulse corresponding to pulse 45 in the same manner as described with respect to the previous action of the NAND gate. The length of the pulse 45 is dependent upon the length of the relatively negative signal applied to the inverting network channel.

Thus, the output appearing at the control lines 9 is the same for both a positive and a negative slope and, in each case, a pulse-width-modulated signal is established creating a modulated time delay in the triggering of the digitizing unit in accordance with the slope of the transmission line voltage changes.

Figure 3:
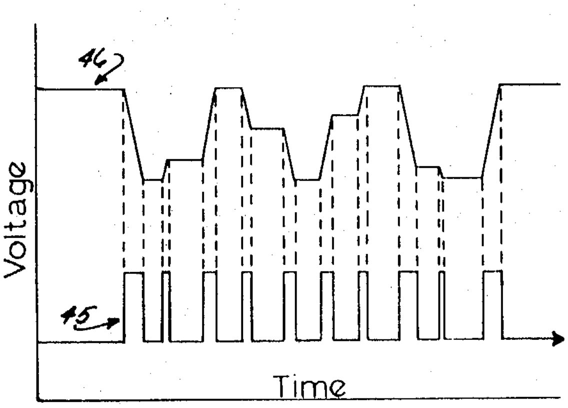
FIG. 3 is a graphical illustration of the output of the transmission line voltage and a pulse-width-modulated control signal such as generated with the circuit shown in FIG. 2 in response to the changes in the transmission line voltage.

Referring particularly to FIG. 3, the transmission line voltage trace 46 is illustrated with constant slope lines joining the changes in the transmission line voltage at a number of data information points, with each point at a different voltage level. The slope of the voltage lines connecting the various data points is essentially the same. The length of the sloping lines, however, varies directly with the change in the voltage level established between immediately successive data-reading points. The application of the transmission line signal to the slope detector 4 results in the pulse-width-modulated trace 45 with a reference level established at each reading point and an increased pulse signal established by each of the slope lines. The width of the control pulses 45 is directly related to and corresponds with the time of the related slope line. The pulse-width-modulated output controls operation of the digitizing unit 3 and particularly establishes an optimized scanning of the system.

Thus, the present invention provides a highly improved data information transmission system in which a transfer time related control insures accurate transmittal of the information with maximum time efficiency.

Various modes of carrying out the invention are contemplated as being within the scope of the following claims which particularly point out and distinctly claim the subject matter which is regarded as the invention.

I claim:

1. A multiplex data acquisition system having a common transmission line connecting a plurality of data points to a common readout means, said data being transmitted at different constant voltage levels with constant current transmission line response between successive data points, comprising sensing means coupled to the transmission line and responsive to a change in transmission line voltage to establish an operating signal during the change from one of said voltage levels to another, and an actuating means connected to said sensing means and to said readout means to actuate said readout means in response to termination of the operating signal.

2. The multiplex data acquisition system of claim 1 wherein said sensing means includes a slope detector connected to the transmission line and responsive to a change in transmission line voltage to establish an operating signal during the change from one of said voltage levels to another, and a pulse circuit means connected to said slope detector to establish a pulse-width-modulated signal connected with a time delay directly related to settling voltage time of the transmission line.

3. The multiplex data acquisition system of claim 1 wherein said sensing means includes a slope detector coupled to the transmission line and establishing an output proportional to the slope of the transmission line voltage and a logic circuit means connected to said slope detector to establish said operating signal during the change from one of said voltage levels to another, and said actuating means being connected to said logic circuit.

4. The multiplex data acquisition system of claim 1 wherein said sensing means including a slope detector coupled to the transmission line and producing a corresponding slope-related signal of a polarity related to the polarity of the slope to establish a first control signal and a second control signal, an inverter means connected to said slope detector to establish a second control signal, and a dual input logic gate means connected to said slope detector and to the inverter means to establish a first logic signal level with the transmission line voltage constant and a second logic signal level in response to the first or second control signal from the slope detector, the change in the logic signal from said second level to said first level operating said readout means to read out the transmission line voltage.

5. The multiplex data acquisition system of claim 1 wherein said sensing means includes a linear amplifier with a capacitive input coupled to the transmission line and a resistive feedback network to define a slope detector producing a corresponding slope-related signal of a polarity related to the polarity of the slope to establish a first control signal and a second control signal, first and second pulse transistors connected to define a pair of pulse networks, said first transistor having an input means connected to said slope detector to establish a logic output related to the first control signal, said second transistor having an input means, an inverter transistor connecting said second transistor to said slope detector to establish a logic output related to the second control, and a pair of diode gates connected one each to each of said pulse transistors and a gate transistor having an input connected to said diode gates to define a NAND gate circuit, said gate transistor being connected to control the readout means.

6. The multiplex data acquisition system of claim 1 wherein said readout means is a digitizing unit having a triggered input responsive to a voltage signal of a selected level, said sensing means including a slope detector coupled to the transmission line and producing a corresponding slope related signal of a polarity related to the polarity of the slope to establish a first control signal and a second control signal, a first pulse-shaping network having an input means connected to said slope detector to establish a logic output related to the first control signal, a second pulse-shaping network having an input means connected to said slope detector and including an inverter means to establish a logic output related to the second control circuit, and a dual input logic gate means connected to said pulse-shaping networks to establish a first logic signal level with said pulse-shaping network in the normal state established with the transmission line voltage constant and a second logic signal level with either of the networks energized by a related control signal, the change in the logic signal from said second level to said first level operating said digitizing means to read out the transmission line.

7. The multiplex data-acquisition system of claim 1 having a multiplexing means including a current limit operational amplifier connected to said transmission line.

8. The multiplex data acquisition system of claim 1 having a multiplexing means actuated by said readout means to transfer the transmission line to a different data point.